United States Patent
Kitamura et al.

[11] Patent Number: 5,822,960
[45] Date of Patent: Oct. 20, 1998

[54] REEL MOWER

[75] Inventors: Junichi Kitamura; Matsuo Tachibana; Koji Fujiwara; Osami Fujiwara; Kazuo Samejima; Junji Miyata; Yoshikazu Togoshi; Hironori Tsuchihashi; Yoshiyuki Esaki, all of Osaka, Japan

[73] Assignee: Kubota Corporation, Osaka, Japan

[21] Appl. No.: 869,598

[22] Filed: Jun. 5, 1997

[30] Foreign Application Priority Data

Jul. 9, 1996 [JP] Japan .................................. 8-178981
Sep. 10, 1996 [JP] Japan .................................. 8-239535

[51] Int. Cl.$^6$ .......................... A01D 75/30; A01D 69/03
[52] U.S. Cl. ................. 56/7; 56/10.9; 56/11.9; 56/10.2 H; 56/DIG. 11; 56/DIG. 15
[58] Field of Search ................... 56/7, 10.2 H, 10.5, 56/10.8, 10.9, 11.1, 11.4, 11.9, 11.3, DIG. 11, DIG. 15, DIG. 20

[56] References Cited

U.S. PATENT DOCUMENTS

| | | | |
|---|---|---|---|
| 3,918,240 | 11/1975 | Haffner et al. ............................... | 56/7 |
| 4,697,404 | 10/1987 | Brockmeier et al. ................ | 56/10.9 X |
| 5,123,234 | 6/1992 | Harada et al. . | |
| 5,309,699 | 5/1994 | Ehn, Jr. .................................... | 56/7 X |
| 5,497,604 | 3/1996 | Lonn .................................... | 56/10.2 H |
| 5,706,638 | 1/1998 | Kinder et al. ............................. | 56/7 X |

FOREIGN PATENT DOCUMENTS 6-62635 3/1994 Japan .

*Primary Examiner*—Heather Shackelford
*Attorney, Agent, or Firm*—Edwin E. Greigg; Ronald E. Greigg

[57] ABSTRACT

A reel mower having side reel mower units and a center reel mower unit connected to a vehicle body to be vertically movable between a lower position for a grass cutting operation and an upper position for a non-operational run. The side reel mower units and center reel mower unit have reels driven by reel drives under control of a control mechanism. A forcible stopping device is provided for forcibly stopping the reel drives of the reel mower units with priority over control of the reel drives by the control mechanism when the side reel mower units and center reel mower unit are all in the upper positions.

8 Claims, 7 Drawing Sheets

( F → FORWARD )
( R → REVERSE )

(F→FORWARD)
(R→REVERSE)

REEL MOWER

BACKGROUND OF THE INVENTION

1. Field of the Invention

This invention relates to a reel mower for cutting grass with rotating reels, and particularly to reel rotation controls.

2. Description of the Related Art

Generally, a reel mower includes a pair of right and left side reel mower units, and a center reel mower unit disposed between the side reel mower units. These mower units are attached to a vehicle body to be vertically movable between a lower position for a grass cutting operation and an upper position for a non-operational run. The mower unit has such a layout that the center reel mower unit cuts grass in an area between two grass cutting areas covered by the right and left side reel mower units. The mower has control mechanisms for driving and stopping the side reel mower units and center reel mower unit individually.

The reel mower having the above construction may be used in an operating mode in which the side reel mower units are set to the lower position and the center reel mower unit to the upper position. In this state, the mower engages in a grass cutting operation, running from one end to the other end of a working site. An uncut area is left between two working tracks of the side reel mower units. Next, when the mower runs in the opposite direction, one of the side reel mower units cuts grass in the uncut area. Thus, two adjacent rows of working area have opposite grass cutting directions to present a striped finish pattern known as a zebra cut.

When all of the reel mower units are raised to the upper position for a non-operational run, the reels if kept driven would be noisy. Thus, the control mechanisms for the side reel mower units and the control mechanism for the center reel mower unit are operated to stop all the reels of the reel mower units. Situations where the side reel mower units and center reel mower unit are raised may occur frequently, such as when the mower makes a turn at an end of a working site and when the mower runs from one site to another. In such a case, the driver must take the trouble of raising and stopping the respective mower units individually.

OBJECT AND SUMMARY OF THE INVENTION

The object of this invention is to provide a reel mower in which reel rotation may be controlled in a simple way in response to raising and lowering of reel mower units. In particular, the invention intends to simplify controls to stop rotation of all reels when the side reel mower units and center reel mower unit are raised, while employing a construction capable of cutting grass only with the side reel mower units or the center reel mower unit.

The above object is fulfilled, according to this invention, by a reel mower comprising a first reel mower unit and a second reel mower unit connected to the vehicle body to be vertically movable between a lower position for a grass cutting operation and an upper position for a non-operational run, and a forcible stopping device for forcibly stopping reels of the reel mower units with priority over control of the reels by a reel control device when the first and second reel mower units are both set to the upper position. Thus, when the reel mower units are set to the upper position, all reels are stopped regardless of a state of the reels controlled by the reel control device, i.e. independently of a control mechanism for controlling the reels. The driver is relieved from the burden of having to carry out reel stopping operations when raising of the reel mower units is frequently required.

Such a reel mower may be realized by the following components:

a vehicle body having drive wheels;

side reel mower units vertically movably connected to the vehicle body and including reel drives;

a center reel mower unit vertically movably connected to the vehicle body and including a reel drive;

a first raising and lowering device for raising and lowering the side reel mower units between a lower position for a grass cutting operation and an upper position for a non-operational run;

a second raising and lowering device for raising and lowering the center reel mower unit between a lower position for a grass cutting operation and an upper position for a non-operational run;

a reel control device for controlling the reel drives of the side reel mower units and the center reel mower unit; and a forcible stopping device for forcibly stopping the reel drives of the reel mower units with priority over control of the reel drives by the reel control device when the side reel mower units and the center reel mower unit are all in the upper positions.

With this construction, when the side reel mower units or the center reel mower unit is/are lowered, the forcible stopping device remains inoperative to allow the reel drives to drive the side reel mower units and the center reel mower unit as controlled by the reel control device. Thus, a grass cutting operation is carried out with the side reel mower units or the center reel mower unit, whichever is in the lower position.

When the side reel mower units and the center reel mower unit are all raised, the forcible stopping device stops all the reels regardless of controls by the reel control device. Thus, when the side reel mower units and the center reel mower unit are raised, all the reels stop automatically without requiring the driver to control each reel. Only the side reel mower units or the center reel mower unit may be lowered and driven to engage in a grass cutting operation to provide a zebra cut, for example. Moreover, when causing the vehicle body to make a turn or a non-operational run, the reels may be stopped automatically simply by raising the mower units.

Other features and advantages of this invention will be apparent from the following description of the embodiments of the invention to be taken with reference to the drawings.

DESCRIPTION OF THE PREFERRED EMBODIMENTS

Figure 1:
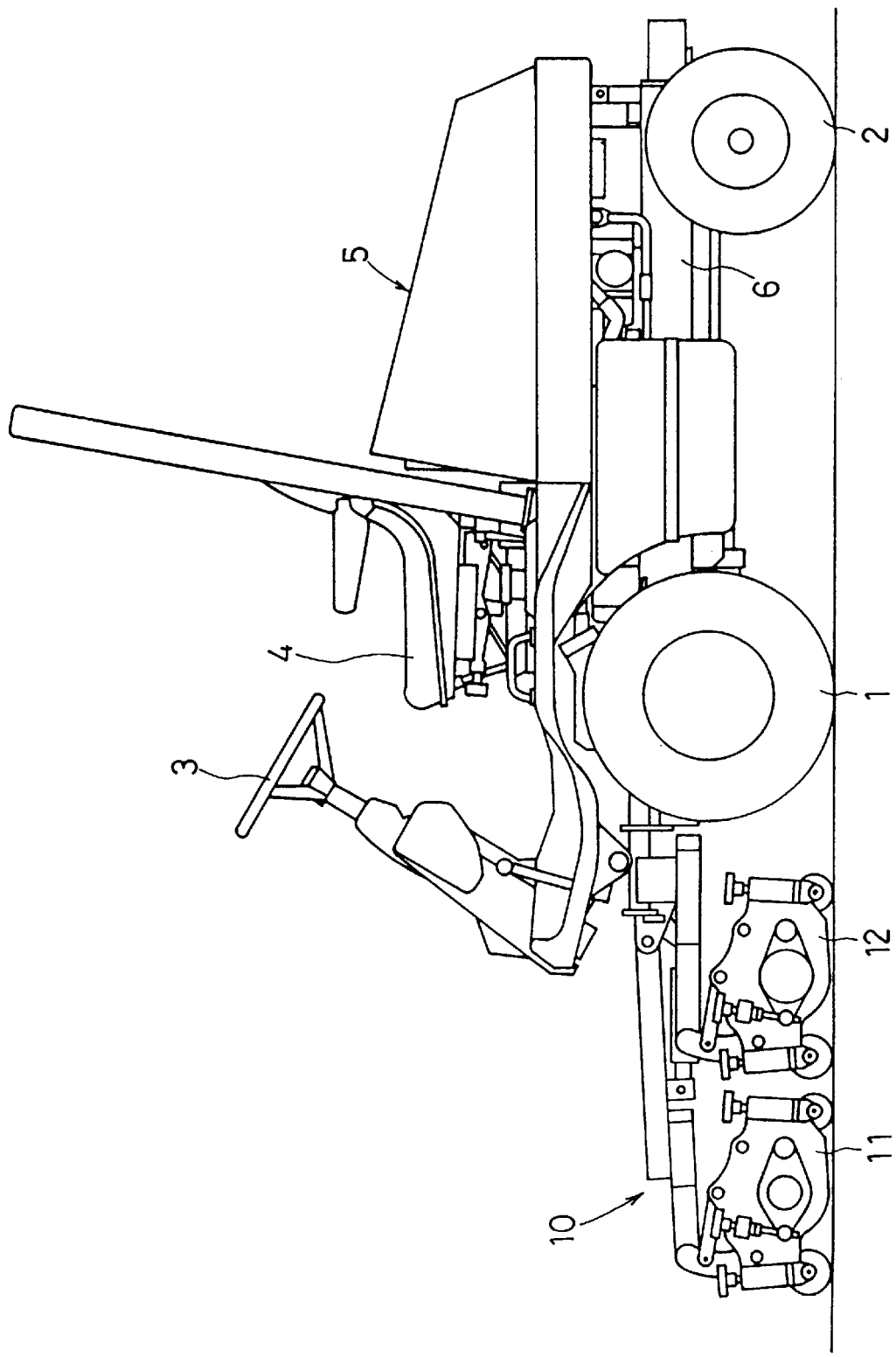
FIG. 1 is a side elevation of a riding reel mower.
Figure 2:
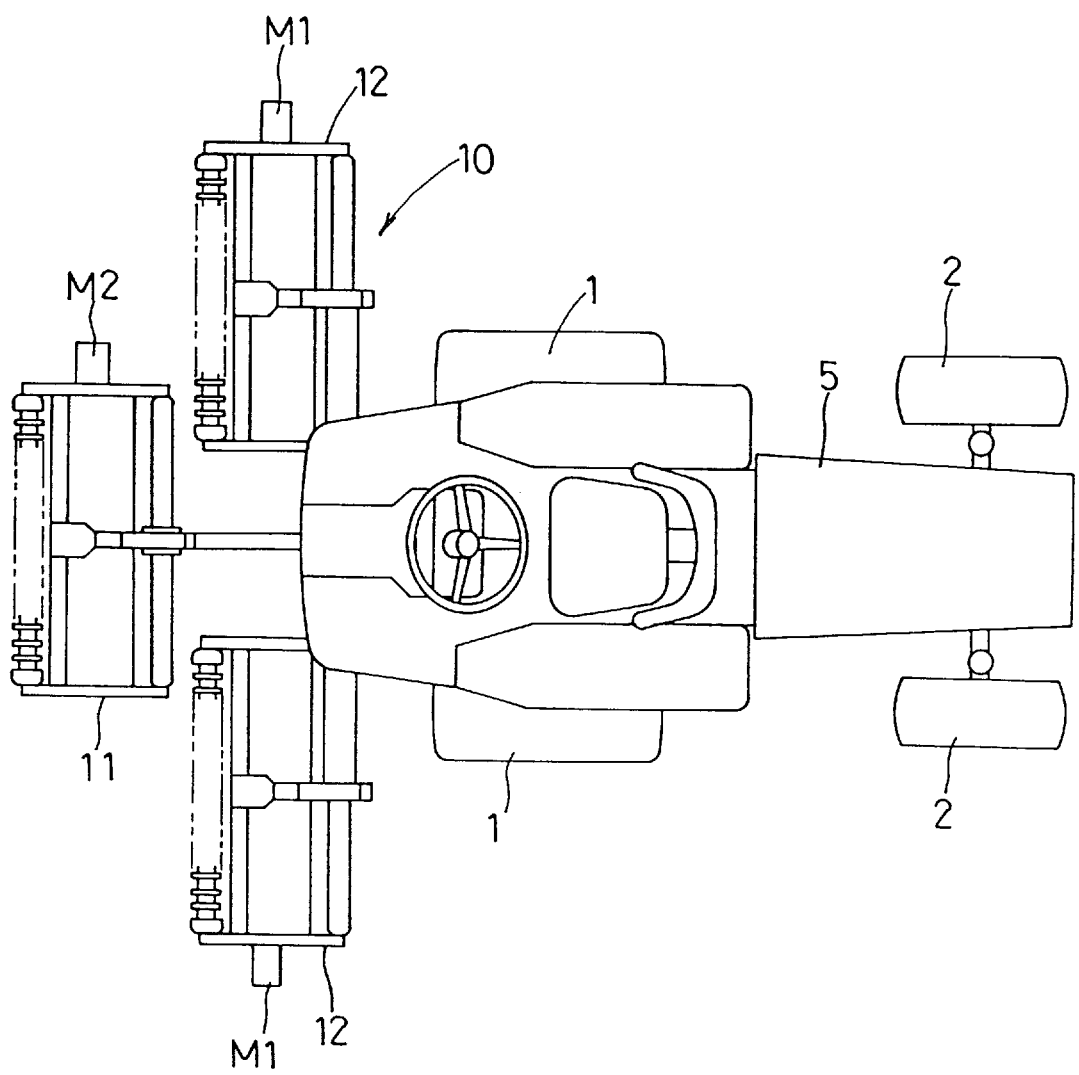
FIG. 2 is a plan view of the mower.

As shown in FIGS. 1 and 2, a riding reel mower has a self-propelled vehicle body with a pair of right and left front drive wheels 1 and a pair of right and left dirigible rear drive wheels 2. The vehicle body includes a driver's section having a steering wheel 3 and a driver's seat 4, and a motor section having an engine (not shown) and an engine hood 5. A mower assembly 10 is connected to the front of the vehicle body, which includes one center reel mower unit 11 and a pair of right and left side reel mower units 12.

Figure 3:
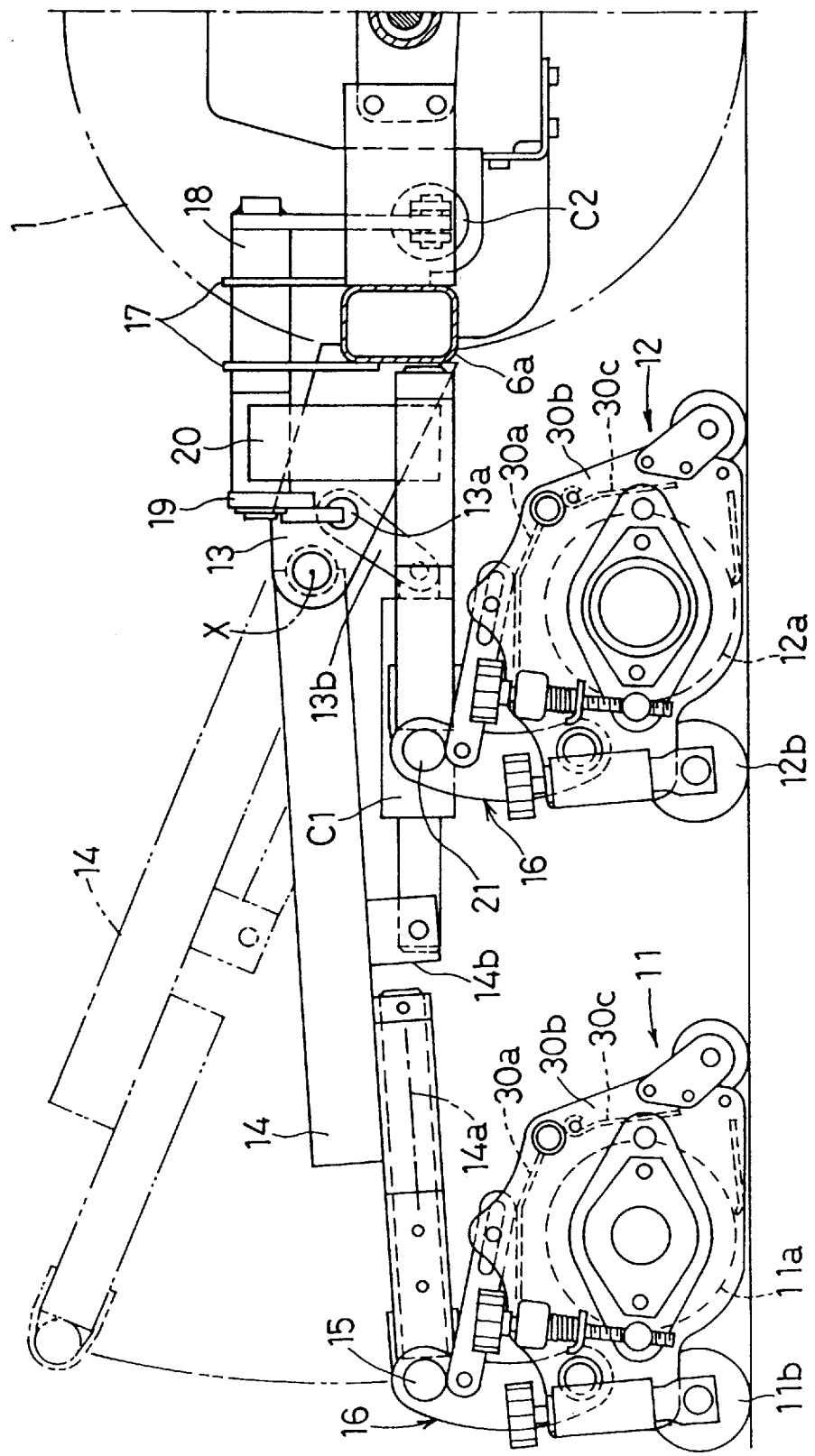
FIG. 3 is a side view of a structure for supporting a center reel mower unit and side reel mower units.
Figure 4:
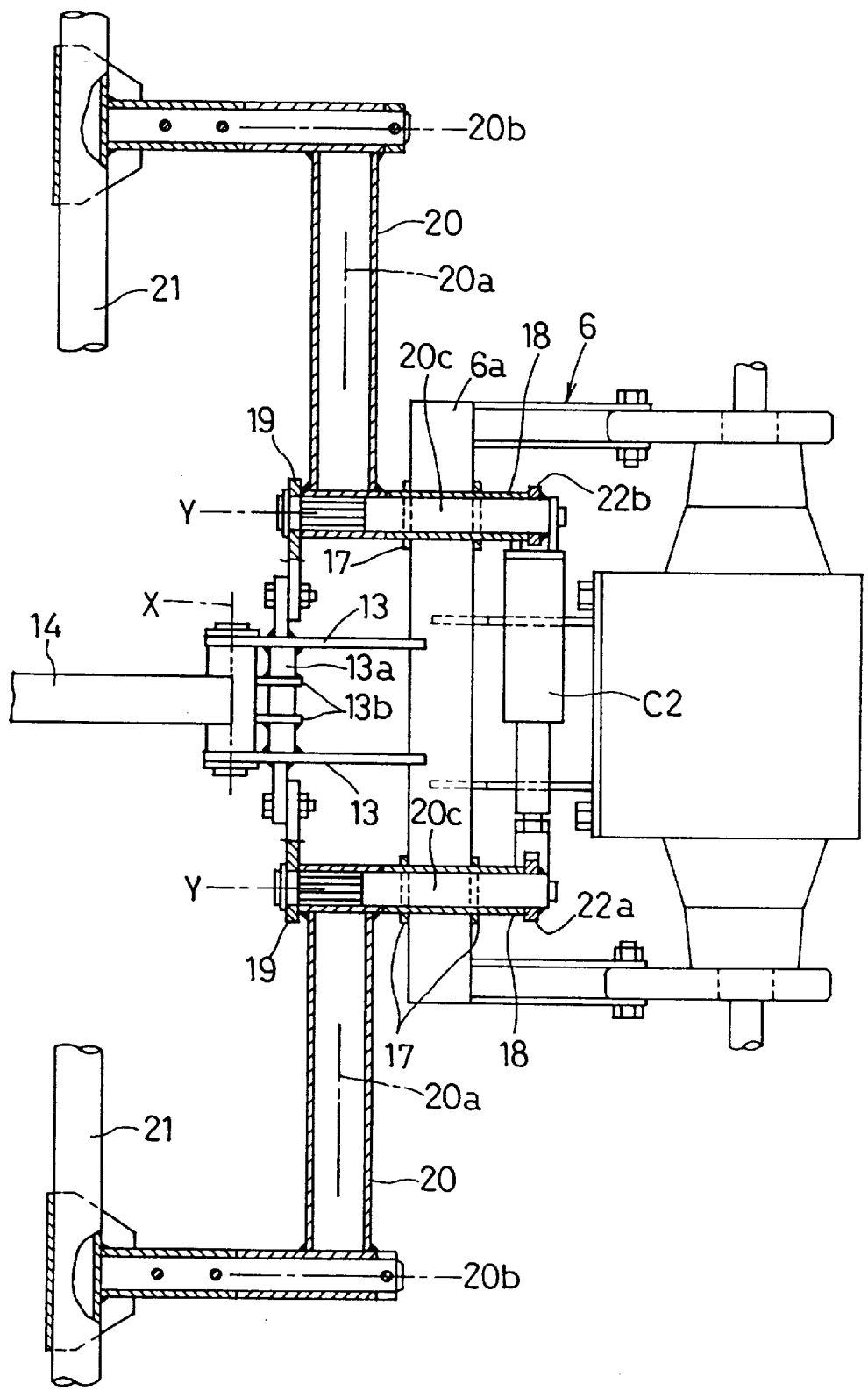
FIG. 4 is a plan view of a connection between mower support arms and a vehicle body frame.

As shown in FIGS. 3 and 4, a forward end portion 6a of a body frame 6 of the vehicle body has a pair of right and left brackets 13 fixed to a transversely middle position thereof. A center support arm 14 extends forward from the brackets 13, with a mower support rod 15 attached to a distal end of the center support arm 14. The mower support rod 15 extends perpendicular to an axis 14a of the center support arm 14 and is rotatable about the axis 14a. The center reel mower unit 11 is suspended from the mower support rod 15 through link mechanisms 16 arranged at opposite ends of the mower support rod 15. A support tube 18 is fixed to each of opposite lateral ends of the forward end frame portion 6a through a bracket 17. A side support arm 20 extends laterally outwardly from the support tube 18 and a bracket 19 supported by one of the brackets 13. A mower support rod 21 is attached to a distal end of the side support arm 20 to be rotatable about an axis 20b extending perpendicular to an axis 20a of the side support arm 20. One of the side reel mower units 12 is suspended from the mower support rod 21 through link mechanisms 16 arranged at opposite ends of the mower support rod 21 and having the same construction as the link mechanisms 16 of the center reel mower unit 11.

As shown in FIGS. 3 and 4, the center support arm 14 has a proximal end thereof supported by the pair of brackets 13 to be rotatable about an axis X extending transversely of the vehicle body. A first lift cylinder C1 extends between a cylinder coupling 14b of the center support arm 14 and a cylinder support arm 13b fixed to the pair of brackets 13 through a support shaft 13a. The first lift cylinder C1 swings the center support arm 14 up and down about the axis X relative to the vehicle body frame 6, thereby moving the center reel mower unit 11 vertically relative to the vehicle body. A proximal end of each of the side support arms 20 is supported by the support tube 18 and bracket 19 to be rotatable about an axis Y extending longitudinally of the vehicle body. The left side support arm 20 is swingably connected to the support tube 18 by a rotary shaft 20c having an end projecting rearward from the support tube 18. A control arm 22a is connected to the end of the rotary shaft 20c to be rotatable therewith. The right side support arm 20 is swingably connected to the support tube 18 by a rotary shaft 20c having an end projecting rearward from the support tube 18. A control arm 22b is connected to the end of the rotary shaft 20c to be rotatable therewith. A second lift cylinder C2 extends between the control arm 22a and control arm 22b. The second lift cylinder C2 swings the right and left side support arms 20 up and down in the same direction about axes Y relative to the body frame 6, thereby moving the side reel mower units 11 vertically relative to the vehicle body at the same time.

Figure 5:
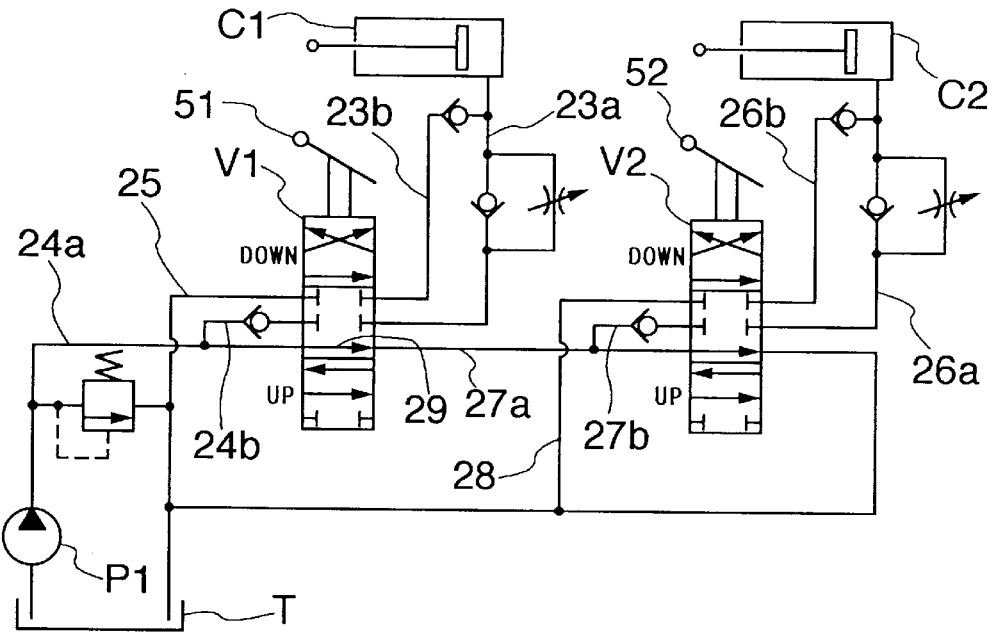
FIG. 5 is a diagram showing a hydraulic circuit for raising and lowering the mower units.

The first lift cylinder C1 and second lift cylinder C2 are single-acting hydraulic cylinders each having a piston movable in one direction by hydraulic pressure and in the other direction by gravity. FIG. 5 shows a hydraulic circuit including a first control valve V1 for controlling the first lift cylinder C1 and a second control valve V2 for controlling the second lift cylinder C2.

The first lift cylinder C1 is connected to the first control valve V1 through control oil lines 23a and 23b. The first control valve V1 is connected to a first hydraulic pump P1 through supply oil lines 24a and 24b. The first control valve V1 is also connected to a tank T through a drain oil line 25. When this control valve V1 is switched to a raising position UP, pressure oil is supplied from the first hydraulic pump P1 to the first lift cylinder C1 through the supply oil lines 24a and 24b, first control valve V1 and control oil line 23a. Then, the first lift cylinder C1 is extended to raise the center reel mower unit 11. When the first control valve V1 is switched to a lowering position DOWN, the supply oil line 24b communicates with the control oil line 23b, and the control oil line 23a with the drain oil line 25. Then, the first lift cylinder C1 contracts under the weight of the center reel mower unit 11, center support arm 14 and so on, to allow descent of the center reel mower unit 11.

The second lift cylinder C2 is connected to the second control valve V2 through control oil lines 26a and 26b. The second control valve V2 is connected to the first control valve V1 through supply oil lines 27a and 27b. The second control valve V2 is also connected to the tank T through a drain oil line 28. When the second control valve V2 is switched to a raising position UP, pressure oil flowing from the first hydraulic pump P1 through the supply oil line 24a and a center bypass oil line 29 of the first control valve V1 is supplied to the second lift cylinder C2 through the supply oil lines 27a and 27b, second control valve V2 and control oil line 26a. Then, the second lift cylinder C2 is extended to raise the right and left side reel mower units 12. When the second control valve V2 is switched to a lowering position DOWN, the supply oil line 27b communicates with the control oil line 26b, and the control oil line 26a with the drain oil line 28. Then, the second lift cylinder C2 contracts under the weight of the side reel mower units 12 and side support arms 20 and so on, to allow descent of the right and left side reel mower units 12.

Figure 6:
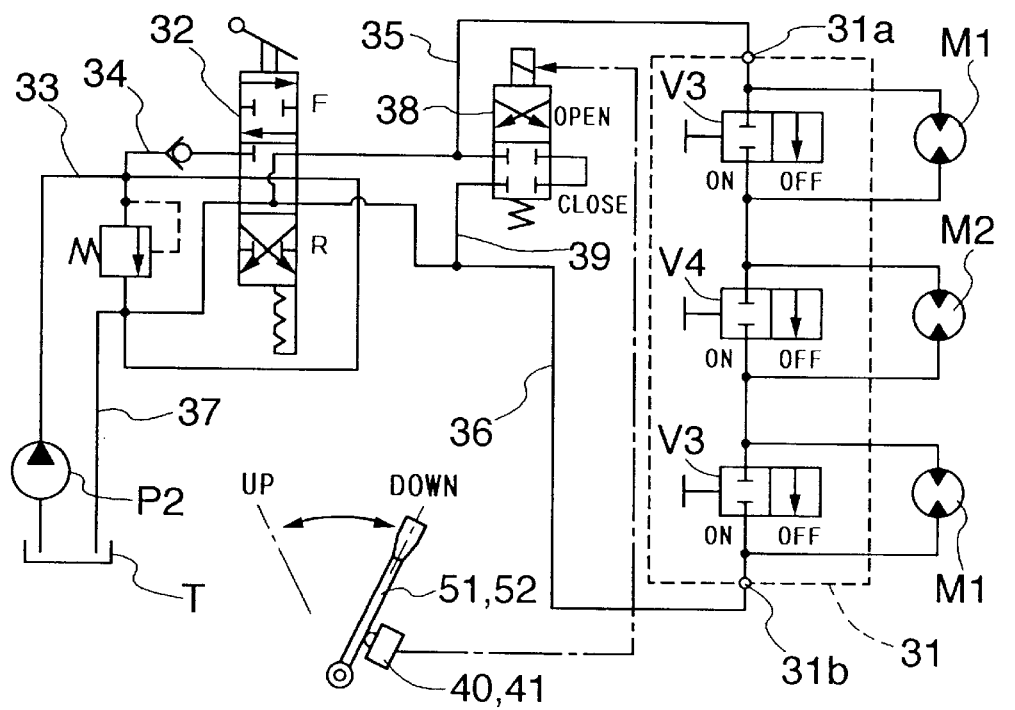
FIG. 6 is a diagram showing a hydraulic circuit for driving the mower units.

The center reel mower unit 11 and side reel mower units 12 have rotary cutters or reels 11a and 12a driven by hydraulic motors M1 and M2 mounted laterally of cutter covers 30, respectively. FIG. 6 shows a hydraulic circuit for controlling these hydraulic motors M1 and M2.

A valve block 31 includes, connected in series, a selector valve V3 for controlling the hydraulic motor M1 of one of the side reel mower units 12, a selector valve V4 for controlling the hydraulic motor M2 of the center reel mower unit 11, and a selector valve V3 for controlling the hydraulic motor M1 of the other side reel mower unit 12. The valve block 31 is connected to a second hydraulic pump P2 through a backward-forward switching valve 32. When the backward-forward switching valve 32 is switched to a forward position FORWARD, pressure oil flowing from the second hydraulic pump P2 through supply oil lines 33 and 34 to the backward-forward switching valve 32 is supplied from this backward-forward switching valve 32 through a drive oil line 35 to a first port 31a of the valve block 31. If the selector valves V3 and V4 are in drive positions ON at this time, the pressure oil is supplied from the first port 31a to the hydraulic motors M1 and M2. Then the hydraulic motors M1 and M2 are driven forward to rotate the reels 11a and 12a in a grass cutting direction. If the selector valves V3 and V4 are in stop positions OFF, the pressure oil flows from the first port 31a through the selector valves V3 and V4, instead of being supplied to the hydraulic motors M1 and M2. Thus, the hydraulic motors M1 and M2 stand still. In either case, the pressure oil is drained from a second port 31b of the valve block 31. This drain oil returns to the tank T through a drive oil line 36, the backward-forward switching valve 32 and a drain oil line 37. When the backward-forward switching valve 32 is switched to a reverse position REVERSE, the pressure oil flowing from the second hydraulic pump P2 through the supply oil lines 33 and 34 to the backward-forward switching valve 32 is supplied from the backward-forward switching valve 32 through the drive oil line 36 to the second port 31b of the valve block 31. If the selector valves V3 and V4 are in drive positions ON at this time, the pressure oil is supplied from the second port 31b to the hydraulic motors M1 and M2. Then the hydraulic motors M1 and M2 are driven backward to rotate the reels 11a and 12a in a direction opposite to the grass cutting direction. If the selector valves V3 and V4 are in stop positions OFF, the pressure oil flows from the second port 31b through the selector valves V3 and V4, instead of being supplied to the hydraulic motors M1 and M2. Thus, the hydraulic motors M1 and M2 stand still. In either case, the pressure oil is drained from the first port 31a of the valve block 31. This drain oil returns to the tank T through the drive oil line 35, backward-forward switching valve 32 and drain oil line 37.

As shown in FIG. 6, a bypass oil line 39 having a switch valve 38 extends from a position of the drive oil line 35 between the backward-forward switching valve 32 and valve block 31 to a position of the drive oil line 36 between the backward-forward switching valve 32 and valve block 31. The switch valve 38 is switchable between an open position OPEN and a close position CLOSE. In the close position CLOSE, the switch valve 38 closes the bypass oil line 39 to break the communication between the drive oil lines 35 and 36 through the bypass oil line 39. This allows the pressure oil flowing from the backward-forward switching valve 32 into the drive oil line 35 or 36 to reach the valve block 31. In the open position OPEN, the switch valve 38 opens the bypass oil line 39 whereby the drive oil lines 35 and 36 are in communication through the bypass oil line 39. The pressure oil supplied from the backward-forward switching valve 32 to one of the drive oil lines 35 and 36 makes a short circuit to the other, instead of flowing to the valve block 31. Thus, the switch valve 38, when switched to the close position CLOSE, enables driving of the center reel mower unit 11 and both side reel mower units 12. When the switch valve 38 is switched to the open position OPEN, the center reel mower unit 11 and side reel mower units 12 are inoperable even if the backward-forward switching valve 32 is in the forward position FORWARD or reverse position REVERSE and the selector valves V3 and V4 are switched to the drive positions ON.

As shown in FIG. 6, a detecting switch 40 is provided for a first control lever 51 disposed in the driver section for controlling the first control valve V1, and a detecting switch 41 is provided for a second control lever 52 disposed in the driver section for controlling the second control valve V2. These detecting switches 40 and 41 detect control operations carried out to raise the center reel mower unit 11 and both side reel mower units 12. That is, when the first control lever 51 is operated to the lowering position DOWN, the first detecting switch 40 is turned off by pressing action of the first control lever 51. When the first control lever 51 is moved from the lowering position DOWN, the pressing action is canceled to turn on the first detecting switch 40. When the second control lever 52 is operated to the lowering position DOWN, the second detecting switch 41 is turned off by pressing action of the second control lever 52. When the second control lever 52 is moved from the lowering position DOWN, the pressing action is canceled to turn on the second detecting switch 41. Thus, the first detecting switch 40 and second detecting switch 41, when turned on, indicate that a control operation has been carried out to raise the center reel mower unit 11 and both side reel mower units 12.

Figure 7:
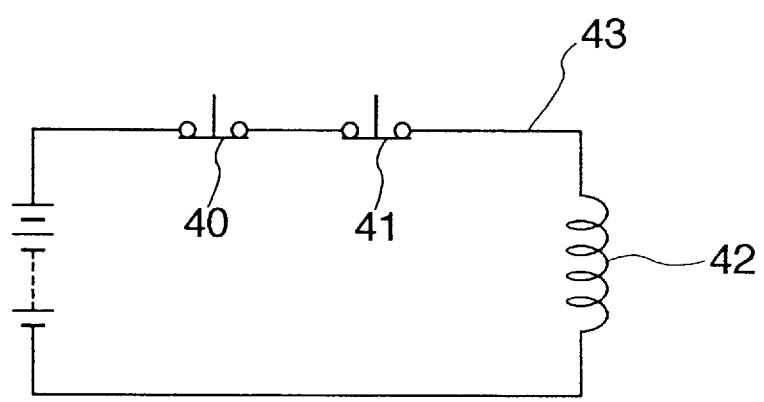
FIG. 7 is a diagram showing an electric circuit for controlling a switch valve.

As shown in FIGS. 6 and 7, the switch valve 38 is in the form of an electromagnetic valve controllable by an electromagnetic solenoid 42. When the solenoid 42 is energized, the switch valve 38 is switched from a close position CLOSE to an open position OPEN. The first detecting switch 40 and second detecting switch 41 are connected in series in a control circuit 43 of solenoid 42 to link the detecting switches 40 and 41 to the switch valve 38. Thus, the switch valve 38 is automatically switchable between a close position CLOSE and an open position OPEN based on information from the detecting switches 40 and 41. That is, when the first and second detecting switches 40 and 41 detect an operation to raise the center reel mower unit 11 and side reel mower units 12, the switch valve 38 is automatically switched to an open position OPEN. When the first and second detecting switches 40 and 41 become non-detecting state, the switch valve 38 is automatically switched to a close position CLOSE.

Thus, when the first control lever 51 is operated to switch the first control valve V1, the center reel mower unit 11 may descend by gravity to an operative position with gage wheels 11b engaging the ground, or may be raised by the first lift cylinder C1 to an inoperative position with the gage wheels 11b lifted from the ground. When the second control lever 52 is operated to switch the second control valve V1, the side reel mower units 12 may descend by gravity to an operative position with gage wheels 12b engaging the ground, or may be raised by the second lift cylinder C2 to an inoperative position with the gage wheels 12b lifted from the ground.

In time of a grass cutting operation, the backward-forward switching valve 32 is switched to a forward position FORWARD.

By switching the selector valve V4 to the drive position ON, the reel 11a of the center reel mower unit 11 becomes in a driven state. With movement of the vehicle body, the reel 11a cuts grass at a height set by the gage wheels 11b. By switching both of the selector valves V3 to the drive positions ON, the reels 12a of side reel mower units 12 become in a driven state. With movement of the vehicle body, the reels 11a cut grass at a height set by the gage wheels 12b. A grass cutting operation may be carried out using the center reel mower unit 11 and side reel mower units 12 at the same time. In the arrangement of the mower units 11 and 12 shown in FIG. 2, the center reel mower unit 11 lies forwardly of a space between the side reel mower units 12. Thus, the center reel mower unit 11 cuts grass, before the side reel mower units 12, between two working tracks of the side reel mower units 12. A grass cutting operation may be carried out using the center reel mower unit 11 or the side reel mower units 12. In this case, the selector valve V4 of the center reel mower unit 11 or the selector valves V3 of the side mower units 12, whichever mower unit(s) 11 or 12 may be raised to the inoperative position, is/are switched to stop position OFF to maintain the reel 11a or reels 12a at rest.

When the vehicle body makes a turn or moves from one working site to another, the first control lever 51 and second control lever 52 are operated to the raising position UP to raise the center reel mower unit 11 and side reel mower units 12 to the respective inoperative positions. At this time, the switch valve 38 is automatically switched to open position OPEN based on the information from the first and second detecting switches 40 and 41 to stop the hydraulic motors M1 and M2. Consequently, the reel 11a of the center reel mower unit 11 and the reels 12a of the side reel mower 12 stops automatically even if the backward-forward switching valve 32 is in a forward position FORWARD and the selector valves V3 and V4 remain in the drive positions ON.

In the foregoing description, the switch valve 38 having the electromagnetic solenoid 42 acts as a forcible stopping device. In place of the electromagnetic solenoid 42, the forcible stopping function may be performed by switching the backward-forward switching valve 32 to a neutral position to return pressure oil from the second hydraulic pump P1 to the drain oil line 37. The detecting switches 40 and 41 may be replaced with sensors for detecting operations to the raising positions UP of the first control valve V1 and the second control valve V2, or sensors for detecting positions of the interlock members such as pivot links interlocking the control levers and control valve V1 and V2, thereby detecting operations to raise the center reel mower unit 11 and side reel mower units 12.

Next, a hydraulic circuit in a different embodiment will be described with reference to FIG. 8. This circuit controls, according to the purpose of this invention, the first lift cylinder C1, the second lift cylinder C2, the hydraulic motors M1 of the side reel mower units 12, and the hydraulic motor M2 of the center reel mower unit 11.

Figure 8:
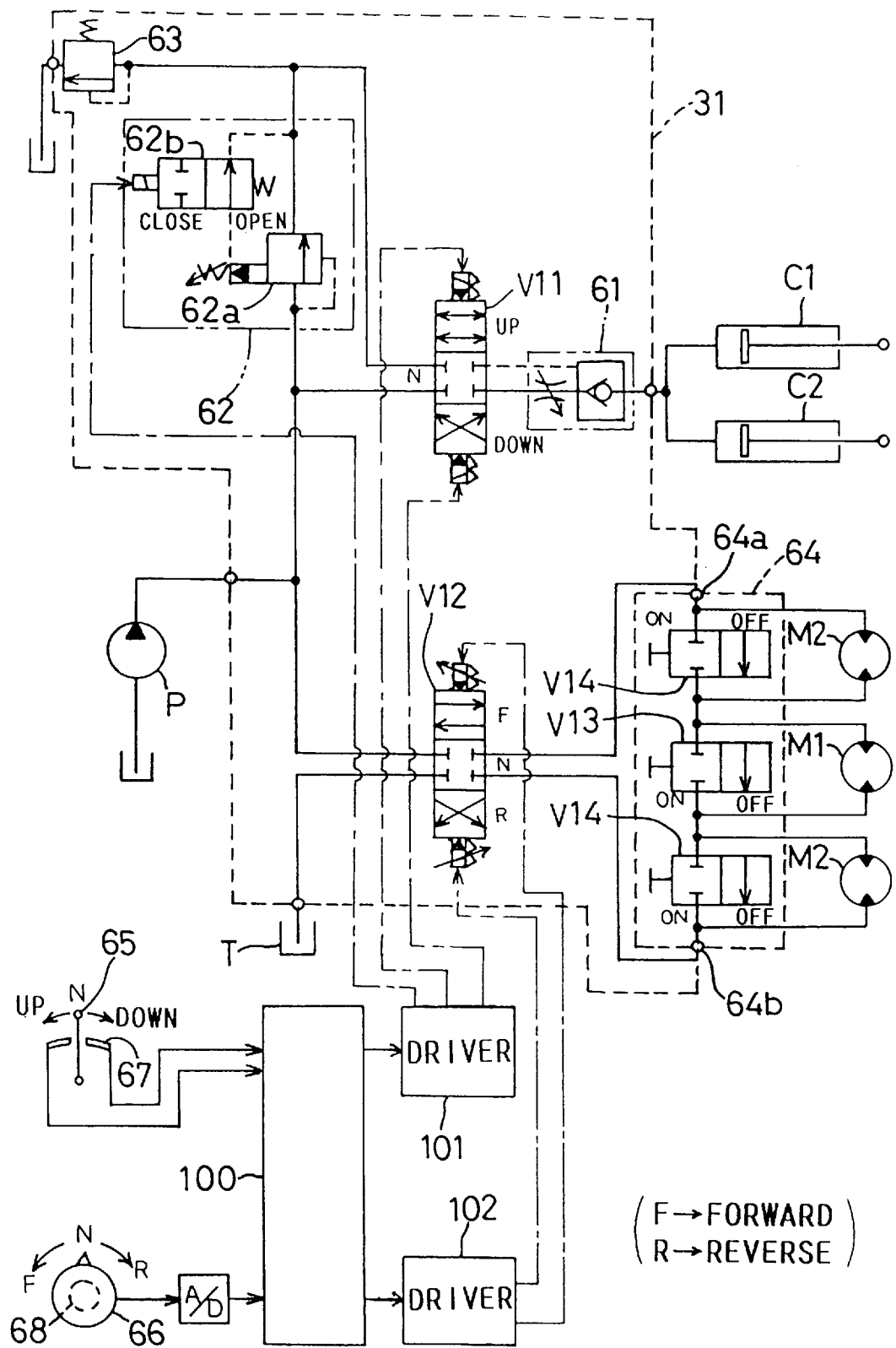
FIG. 8 is a diagram showing a hydraulic circuit in a different embodiment.

As shown in FIG. 8, the hydraulic circuit includes a reel mower unit raising and lowering electromagnetic valve V11 and a reel mower unit driving electromagnetic proportional control valve V12 connected in parallel to each other to a fixed displacement pump P driven by the engine not shown. The first lift cylinder C1 and the second lift cylinder C2 for raising and lowering the reel mower units are connected in parallel downstream of the reel mower unit raising and lowering electromagnetic valve V11. A pilot check valve 61 with a fall preventing throttle is mounted on an oil line extending from the electromagnetic valve V11 to the cylinders C1 and C2. An unload relief valve 62 is mounted on a bypass oil line extending between a supply line and a drain line of the electromagnetic valve V11. A back pressure relief valve 63 is disposed downstream of the unload relief valve 62 for reducing a reel mower unit ground pressure. Selector valves V14, V13 and V14 are connected in series downstream of the electromagnetic proportional control valve V12 for stopping the hydraulic motors M2, M1 and M2, respectively.

The unloading relief valve 62 includes a relief valve 62a and a solenoid opening and closing valve 62b. The solenoid opening and closing valve 62b is switched to a close position CLOSE by operation of one of the electromagnetic valves V11 and V12. That is, the solenoid opening and closing valve 62b is switched to a close position CLOSE when the electromagnetic valve V11 is switched to a raising position UP or a lowering position DOWN. The solenoid opening and closing valve 62b is switched to a close position CLOSE when the electromagnetic valve V12 is switched to a forward position FORWARD or a reverse position REVERSE. Then, the relief valve 62a is set to a maximum load pressure. When the two electromagnetic valves V11 and V12 are switched to neutral positions N, the solenoid opening and closing valve 62b is switched to an open position OPEN to unload the pressure oil from the pump P.

The reel mower unit raising and lowering electromagnetic valve V11 and reel mower unit driving electromagnetic proportional control valve V12 are incorporated into one miniblock 31, to minimize numbers of pipes and couplings for a pressure loss reduction and cost reduction. The selector valves V14, V13 and V14 for stopping the hydraulic motors M2, M1 and M2 are attached to the maniblock 31 through a valve block 64.

Pressure oil is supplied from the hydraulic pump P to the lift cylinders C1 and C2 when the electromagnetic valve V11 is switched to a raising position UP. Then, the lift cylinders C1 and C2 are extended to raise the center reel mower unit 11 and right and left side reel mower units 12. When the electromagnetic valve V11 is switched to a lowering position DOWN, the check valve 61 is opened to allow the hydraulic cylinders C1 and C2 to contract under the weight of the reel mower units.

On the other hand, when the electromagnetic proportional control valve V12 is switched to a forward position FORWARD, pressure oil is supplied from this electromagnetic proportional control valve V12 to a first port 64a of the valve block 64. If the selector valves V13 and V14 are in drive positions ON at this time, the pressure oil is supplied from the first port 64a to the hydraulic motors M1 and M2. Then the hydraulic motors M1 and M2 are driven forward to rotate the rotary cutters 11a and 12a in a grass cutting direction. If the selector valves V13 and V14 are in the stop positions OFF, the pressure oil flows from the first port 64a through the selector valves V13 and V14, instead of being supplied to the hydraulic motors M1 and M2. Thus, the hydraulic motors M1 and M2 stand still. In either case, the pressure oil is drained from a second port 64b of the valve block 64 to return to a tank T.

When the electromagnetic proportional control valve V12 is switched to a reverse position REVERSE, pressure oil is supplied from this electromagnetic proportional control valve V12 to the second port 64b of the valve block 64. If the selector valves V13 and V14 are in the drive positions ON at this time, the pressure oil is supplied from the second port 64b to the hydraulic motors M1 and M2. Then the hydraulic motors M1 and M2 are driven backward to rotate the rotary cutters 11a and 12a in a direction opposite to the grass cutting direction. If the selector valves V13 and V14 are in the stop positions OFF, the pressure oil flows from the second port 64b through the selector valves V13 and V14, instead of being supplied to the hydraulic motors M1 and M2. Thus, the hydraulic motors M1 and M2 stand still. In either case, the pressure oil is drained from the first port 64a of the valve block 64 to return to the tank T.

The reel mower unit raising and lowering hydraulic cylinders C1 and C2 are operable by a raising and lowering lever 65. The reel mower unit driving hydraulic motors M1 and M2 are controllable by an adjusting dial 66 to rotate forward or backward at a varied rotating rate according to an amount of operation thereof.

An operation of the raising and lowering lever 65 is detected by a rotary switch 67 which inputs a detection signal to a control unit 100 having a microprocessor. A turning direction and an amount of operation of the adjusting dial 66 are detected by a potentiometer 68 which inputs a detection signal to the control unit 100 through an A/D converter. Upon receipt of the signal from the rotary switch 67, the control unit 100 outputs a control signal to a driver 101 of the mower raising and lowering electromagnetic valve V11. Based on a result of detection, the electromagnetic valve V11 is operated to a raising position UP or a lowering position DOWN. The solenoid opening and closing valve 62b of the unloading relief valve 62 is operated to a close position CLOSE. Upon receipt of the signal from the rotary switch 67, the control unit 100 outputs a signal to a driver 102 of the mower driving electromagnetic proportional control valve V12. Based on a result of detection, the electromagnetic proportional control valve V12 is operated to a forward position FORWARD or a reverse position REVERSE, and adjusted to an opening degree according to the amount of operation. The control unit 100 outputs intermittent pulses in a duty cycle corresponding to the amount of operation of the adjusting dial 66 to drive a power transistor of the driver 102 to drive the solenoid of the electromagnetic proportional control valve V12.

The control unit 100 permits switching of the mower driving electromagnetic valve V12 only when the mower raising and lowering electromagnetic valve V11 is in the lowering position, and switches the mower driving electromagnetic valve V12 from a drive position to a stop position when the mower raising and lowering electromagnetic valve V11 is switched to the raising position. That is, when the adjusting dial 66 is turned forward F or backward R, the control unit 100 determines by means of the rotary switch 67 whether the raising and lowering lever 67 is in the lowering position DOWN or not. If the raising and lowering lever 67 is in the lowering position DOWN, the control unit 100 operates the electromagnetic proportional control valve V12 to the forward position F or the reverse position R to drive the hydraulic motors. If the reel mower unit raising and lowering lever 65 is operated to raising position UP with the adjusting dial 66 turned forward or backward, the electromagnetic proportional control valve V12 is operated to a neutral position N to stop the hydraulic motors.

The foregoing relates to preferred exemplary embodiments of the invention, it being understood that other variants and embodiments thereof are possible within the spirit and scope of the invention, the latter being defined by the appended claims.

What is claimed is:

1. A reel mower comprising:

a vehicle body having drive wheels;

a first reel mower unit vertically movably connected to said vehicle body and including a reel drive;

a second reel mower unit vertically movably connected to said vehicle body and including a reel drive;

first raising and lowering means for raising and lowering said first reel mower unit between a lower position for a grass cutting operation and an upper position for a non-operational run;

second raising and lowering means for raising and lowering said second reel mower unit between a lower position for a grass cutting operation and an upper position for a non-operational run;

reel control means for controlling the reel drives of said first reel mower unit and said second reel mower unit; and forcible stopping means for forcibly stopping said reel drives of the reel mower units wherein said forcible stopping means has priority over said reel control means for controlling said reel drives only when said first reel mower unit and said second reel mower unit are both in the upper position.

2. A reel mower as defined in claim 1, wherein said first reel mower unit comprises a pair of right and left side reel mower units, and said second reel mower unit comprises a center reel mower unit disposed between said side reel mower units.

3. A reel mower as defined in claim 2, wherein each of said reel drives includes a hydraulic motor for rotating said reel, said reel control means including a control valve for controlling pressure oil supply to said hydraulic motor.

4. A reel mower as defined in claim 3, wherein said forcible stopping means comprises a shutoff valve for stopping the pressure oil supply to both hydraulic motors.

5. A reel mower as defined in claim 3, further comprising a switching valve having a first position for supplying pressure oil in a direction to rotate the hydraulic motors forward, a second position for supplying pressure oil in a direction to rotate the hydraulic motors backward, wherein said switching valve, when switched to a third position, acts as said forcible stopping means.

6. A reel mower comprising:

a vehicle body having drive wheels;

a first reel mower unit vertically movably connected to said vehicle body;

a second reel mower unit vertically movably connected to said vehicle body;

first raising and lowering means for raising and lowering said first reel mower unit between a lower position for a grass cutting operation and an upper position for a non-operational run;

second raising and lowering means for raising and lowering said second reel mower unit between a lower position for a grass cutting operation and an upper position for a non-operational run;

first hydraulic drive means for driving reels of said first reel mower unit and said second reel mower unit;

second hydraulic drive means for driving said first raising and lowering means and said second raising and lowering means;

reel control means for controlling said first hydraulic drive means;

raising and lowering control means for controlling said second hydraulic drive means; and forcible stopping means for forcibly stopping said first hydraulic drive means wherein said forcible stopping means has priority over said reel control means for controlling said reel drives only when said first reel mower unit and said second reel mower unit are both in the upper position.

7. A reel mower as defined in claim 6, wherein said forcible stopping means comprises a shutoff valve for stopping pressure oil supply to said first hydraulic drive means.

8. A reel mower as defined in claim 6, wherein said raising and lowering control means comprises a raising and lowering control valve for controlling pressure oil supply to said second hydraulic drive means, said forcible stopping means forcibly stopping said first hydraulic drive means in response to a position of said raising and lowering control valve.

* * * * *